(12) United States Patent
Shana'a

(10) Patent No.: US 11,633,767 B2
(45) Date of Patent: Apr. 25, 2023

(54) SYSTEMS AND METHODS FOR RECOVERING LANDFILL GAS

(71) Applicant: Saudi Arabian Oil Company, Dhahran (SA)

(72) Inventor: Jihad Shana'a, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 7 days.

(21) Appl. No.: 17/229,360

(22) Filed: Apr. 13, 2021

(65) Prior Publication Data
US 2022/0324001 A1  Oct. 13, 2022

(51) Int. Cl.
*B09B 1/00* (2006.01)
*B09B 3/80* (2022.01)

(52) U.S. Cl.
CPC ............... *B09B 3/80* (2022.01); *B09B 1/004* (2013.01); *Y02W 30/30* (2015.05)

(58) Field of Classification Search
CPC .......... B09B 1/004; B09B 3/80; Y02W 30/30; B09C 1/005; E02D 31/006
See application file for complete search history.

(56) References Cited

U.S. PATENT DOCUMENTS

| | | | |
|---|---|---|---|
| 3,586,624 A * | 6/1971 | Larson | B09B 1/00 405/129.95 |
| 3,986,365 A | 10/1976 | Hughes | |
| 4,166,709 A * | 9/1979 | Valiga | B09B 1/00 588/259 |
| 4,592,931 A | 6/1986 | Cargle | |
| 4,908,129 A * | 3/1990 | Finsterwalder | B09B 1/00 405/129.7 |
| 5,054,962 A * | 10/1991 | Bahnmuller | B09B 1/004 405/129.8 |
| 5,562,586 A | 10/1996 | Hyde-Smith | |
| 5,690,448 A * | 11/1997 | Fasullo | B09B 1/004 405/129.95 |
| 5,857,807 A * | 1/1999 | Longo, Sr. | E21B 43/305 405/129.95 |
| 5,897,946 A * | 4/1999 | Nachtman | E02B 3/12 405/268 |
| 5,915,881 A | 6/1999 | Williams | |
| 6,082,929 A | 7/2000 | Williams | |
| 6,334,737 B1 * | 1/2002 | Lee | C12M 41/26 405/129.95 |

(Continued)

OTHER PUBLICATIONS

Barlaz et al., "Controls on Landfill Gas Collection Efficiency: Instantaneous and Lifetime Performance", Air & Waste Management Association, vol. 59, pp. 1399-1404, Dec. 2009.

(Continued)

*Primary Examiner* — Benjamin F Fiorello
(74) *Attorney, Agent, or Firm* — Dinsmore & Shohl LLP

(57) ABSTRACT

A landfill gas recovery system includes a waste layer disposed in a landfill and a capping layer overlying the waste layer. The capping layer includes a cured sealing layer and a loose fill layer between the waste layer and the cured sealing layer. The loose fill layer includes a granular fill material. The cured sealing layer includes a composite of the granular fill material and a cured water soluble polymer. The cured sealing layer is substantially impermeable to landfill gases formed within the waste layer.

20 Claims, 4 Drawing Sheets

(56) References Cited

U.S. PATENT DOCUMENTS

| | | | |
|---|---|---|---|
| 6,386,796 B1* | 5/2002 | Hull | B09C 1/00 405/128.25 |
| 6,806,298 B1 | 10/2004 | Nachtman et al. | |
| 9,101,968 B2* | 8/2015 | Ng | B09B 1/004 |
| 9,441,332 B2 | 9/2016 | Hanley et al. | |
| 2005/0084334 A1 | 4/2005 | Shi et al. | |
| 2005/0201831 A1* | 9/2005 | Lee | B09B 1/00 405/129.95 |
| 2006/0034664 A1* | 2/2006 | Augenstein | B09B 1/00 405/129.95 |
| 2006/0222463 A1* | 10/2006 | Subbarayan | B09B 3/00 405/129.85 |
| 2008/0069642 A1* | 3/2008 | Ayers | B09B 1/004 405/129.45 |
| 2010/0230111 A1* | 9/2010 | Stamoulis | E21B 29/06 166/105 |
| 2011/0045580 A1* | 2/2011 | Hater | C12M 23/18 435/290.4 |
| 2011/0061874 A1* | 3/2011 | Stamoulis | E21F 7/00 166/105 |
| 2013/0272795 A1* | 10/2013 | Hull | B09B 1/004 405/129.45 |
| 2017/0216893 A1* | 8/2017 | Campanella | B09B 1/00 |
| 2019/0262797 A1* | 8/2019 | Larson | B09B 1/002 |

OTHER PUBLICATIONS

Caicedo-Concha et al., The potential of methane production using aged landfill waste in developing countries: A case of study in Colombia, vol. 6, pp. 1-14, 2019.

Liu et al., "Study on the Permeability Characteristics of Polyurethane Soil Stabilizer Reinforced Sand", Advances in Materials Science and Engineering, vol. 2017, Article ID 5240186, 14 pages, Apr. 20, 2017.

Liu et al., "Evaluation of Strength Properties of Sand Modified with Organic Polymers", Polymers, vol. 10, No. 287, pp. 1-15, 2018.

Olisa et al., "Methane Recovery Technologies from Landfills for Energy Eneration and Leachate Reduction—an Overview", Research Journal of Applied Science, Engineering and Technology, vol. 11, No. 4, pp. 378-387, 2015.

Qi et al., "Improvement of Water Stability of Sand Admixed with Water-Soluble Organic Polymer", International Journal of Polymer Science, vol. 2020, Article ID 5705143, 16 pages, Jul. 13, 2020.

Rezaeimalek et al., "Evaluation of curing method and mix design of a moisture activated polymer for sand stabilization", Construction and Building Materials, vol. 146, pp. 210-220, 2017.

The World Bank, "Solid Waste Management", https://www.worldbank.org/en/topic/urbandevelopment/brief/solid-waste-management, Retrieved Apr. 28, 2021.

* cited by examiner

SYSTEMS AND METHODS FOR RECOVERING LANDFILL GAS

TECHNICAL FIELD

Embodiments of the present disclosure generally relate to landfills, more specifically, to systems and methods for recovering landfill gas.

BACKGROUND

About 2.01 billion tons of municipal solid waste are generated annually, and this municipal solid waste may be disposed of in landfills. Several environmental and health concerns are associated with the disposal of municipal solid waste in landfills. These concerns may include the generation of greenhouse gasses, the contamination of soil and water, and the release of odor and unsanitary material from the landfills. The disposal of municipal solid waste in landfills may generate landfill gas, which may comprise greenhouse gasses such as methane and carbon dioxide. Methane is a greenhouse gas that may significantly contribute to climate change and has a global warming potential about 25 to 30 times greater than that of carbon dioxide.

SUMMARY

There is a desire to capture methane and other landfill gasses before they leave the landfill and enter the atmosphere. Methane and carbon dioxide are greenhouse gasses that may contribute to climate change. Additionally, methane may be isolated and used as a fuel source for energy generation. It also may be beneficial to remove methane trapped within the landfill to avoid the formation of methane pockets within the landfill that can increase fire risks within the landfill. Thus, ongoing needs exist for improved landfill covers and landfill gas recovery systems to prevent methane and other landfill gasses from escaping into the atmosphere, to allow for the withdrawal of methane from the landfill, or to increase recoverability of methane from the landfill for valuable uses.

Embodiments of the present disclosure address at least some of these problems and are related to landfill gas recovery systems and methods for sealing landfills. As described in embodiments herein, landfill gas recovery systems may include a capping layer positioned over a waste layer in a landfill. The capping layer may effectively trap landfill gasses, including methane, within the landfill, preventing the methane from entering the atmosphere and allowing the methane to be recovered for purposes including, but not limited to, energy generation. The capping layer may comprise a cured sealing layer and a loose fill layer between the cured sealing layer and the waste layer. The landfill may include gas collection equipment positioned below the capping layer to remove methane from the landfill. The capping layer may be formed by applying a loose fill layer over municipal solid waste disposed in a landfill, spraying an aqueous solution comprising a water soluble polymer over the loose fill layer and allowing the water soluble polymer to cure and form a layer that is substantially impermeable to landfill gas. As a result of the capping layer, landfill gas may be prevented from escaping into the atmosphere and landfill gas collection equipment may be used to withdraw methane trapped within the landfill.

According to one or more embodiments, a landfill gas recovery system may comprise a waste layer disposed in a landfill and a capping layer overlying the waste layer. The capping layer may comprise a cured sealing layer and a loose fill layer between the waste layer and the cured sealing layer. The loose fill layer may comprise a granular fill material. The cured sealing layer may comprise a composite of the granular fill material and a cured water soluble polymer. The cured sealing layer is substantially impermeable to landfill gases formed within the waste layer.

According to one or more embodiments, a method for sealing a landfill for recovery of landfill gas from the landfill may comprise applying an aqueous solution comprising a water soluble polymer onto a landfill cover overlying a waste layer of a landfill. The landfill cover may comprise a loose fill layer comprising a granular fill material. The method may comprise continuing to apply the aqueous solution until at least a portion of the granular fill material is saturated with the aqueous solution to a predetermined depth of the granular fill material and allowing the aqueous solution to cure to form a capping layer over the landfill. The capping layer may comprise a cured sealing layer and an uncured portion of the loose fill layer between the waste layer and the cured sealing layer. The cured sealing layer may comprise a composite of the granular fill material and a cured product of the water soluble polymer. The cured sealing layer may be substantially impermeable to landfill gases formed within the waste layer.

Additional features and advantages of the described embodiments will be set forth in the detailed description that follows, and in part will be readily apparent to those skilled in the art from that description or recognized by practicing the described embodiments, including the detailed description that follows and the claims.

BRIEF SUMMARY OF THE DRAWINGS

The following detailed description of specific embodiments of the present disclosure can be best understood when read in conjunction with the following drawings.

Reference will now be made in detail to various embodiments, some embodiments of which are illustrated in the accompanying drawings. Whenever possible, the same reference numerals will be used throughout the drawings to refer to the same or similar parts.

DETAILED DESCRIPTION

The detailed description discloses one or more embodiments relevant to the appended claims. One or more embodiments of the present disclosure are directed to landfill gas recovery systems. The landfill gas recovery systems generally may comprise a layer of municipal waste disposed within a landfill and a capping layer overlying the layer of municipal waste. The capping layer may be substantially impermeable to landfill gasses, and landfill gas collection equipment may be positioned in the landfill to allow the withdrawal of landfill gasses from the landfill.

Figure 1:
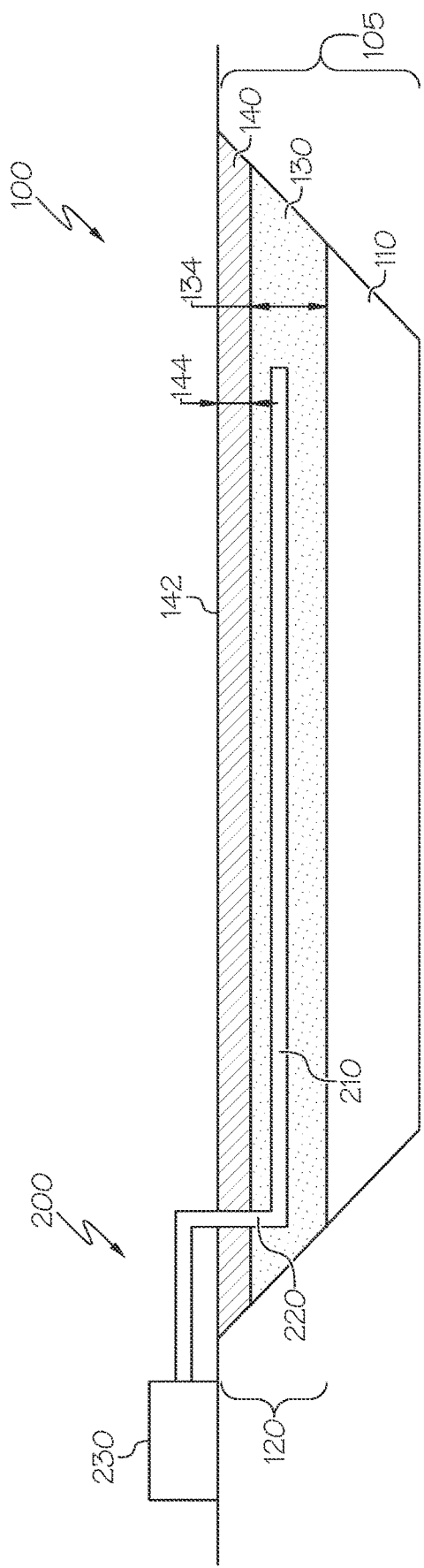
FIG. 1 is a cross-sectional view of a landfill gas recovery system, according to one or more embodiments described in this disclosure.

Referring now to FIG. 1, a landfill gas recovery system 100 may comprise a waste layer 110 disposed in a landfill 105. The waste layer 110 may comprise any conglomeration or mixture of materials capable of generating landfill gases such as methane or carbon dioxide over time by processes including, but not limited to decomposition of organic matter in the waste layer 110. In embodiments, the waste layer 110 may be composed of municipal solid waste. Municipal solid waste may include, for example, a mixture of food waste, yard waste, plastic containers and product packaging materials, and other miscellaneous solid waste in any proportion and may have been produced or generated from residential, commercial, institutional, or even industrial sources.

As should be appreciated by those of ordinary skill in the art, municipal solid waste disposed in a landfill 105 is commonly covered daily with a daily cover material to prevent wind-blown litter, deter scavenging by birds or other animals, prevent fly infestations, reduce odor, reduce dust, or reduce the risk of fire in the landfill. Thus, it should be understood that in one or more embodiments, the waste layer 110 may comprise the municipal solid waste in combination with daily cover material that has been applied to the municipal solid waste regularly over the course of time.

The municipal solid waste may be capable of generating landfill gasses. As described herein, "landfill gasses" may refer to a mixture of gasses generated by the decomposition of municipal solid waste within a landfill. In one or more embodiments, landfill gas may include methane, carbon dioxide, or both. In some examples, the landfill gas may include from 40% to 60% by volume methane ($CH_4$). In further examples, the landfill gas may include from 40% to 60% by volume carbon dioxide ($CO_2$). The landfill gas may further comprise trace amounts of hydrogen sulfide and other non-methane organic compounds. As described herein, a "trace amount" may refer to an amount less than 5% by volume, less than 3% by volume, less than 1% by volume, less than 0.5% by volume, or even less than 0.1% by volume. For example, the landfill gas may comprise less than 5% by volume, less than 3% by volume, less than 1% by volume, less than 0.5% by volume, or even less than 0.1% by volume hydrogen sulfide.

Figure 2:
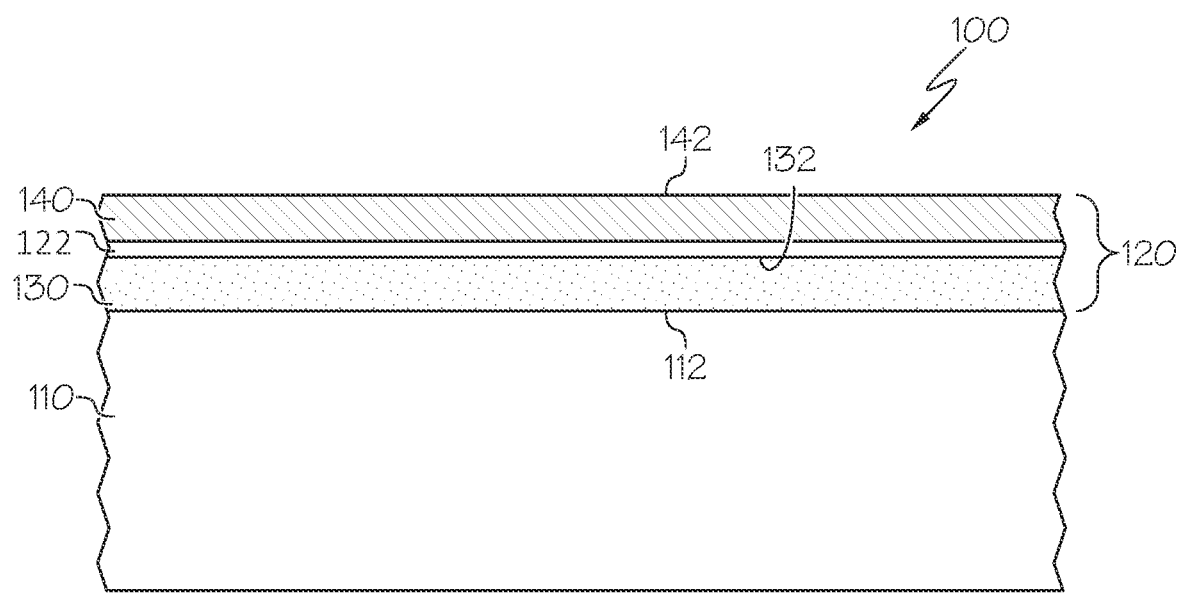
FIG. 2 is a cross-sectional view of a capping layer of a landfill gas recovery system, according to one or more embodiments described in this disclosure.

Referring to FIGS. 1 and 2, the landfill gas recovery system 100 may comprise a capping layer 120 overlying the waste layer 110. The capping layer 120 may comprise a cured sealing layer 140 and a loose fill layer 130. The loose fill layer 130 may be positioned between the waste layer 110 and the cured sealing layer 140. In one or more embodiments, the capping layer 120 may be in direct contact with at least a portion of the waste layer 110. The direct contact between the capping layer 120 and the waste layer 110 may occur at surface 112 of the waste layer 110. In one or more embodiments, the cured sealing layer 140 may be in direct contact with at least a portion of the loose fill layer 130. The direct contact between the cured sealing layer 140 and the loose fill layer 130 may occur at surface 132 of the loose fill layer 130. It should be understood that the heights or thicknesses of the waste layer 110, the capping layer 120, the loose fill layer 130, and the cured sealing layer 140 as shown in FIGS. 1 and 2 are not intended to be to scale but, rather, to illustrate the relative positions of the layers in the landfill gas recovery system 100.

In one or more embodiments, the top surface 142 of the cured sealing layer 140 may be an air-side surface that is exposed to the atmosphere. When the top surface 142 of the cured sealing layer 140 is an air-side surface, the capping layer 120 may function as a final cover for the landfill 105.

As described herein, a landfill "final cover" is a cover positioned over the landfill 105 when the landfill 105 is closed. The final cover may reduce infiltration of water into the landfill 105, reduce erosion, control emissions of landfill gas, or improve the aesthetics of the landfill. In one or more embodiments, the top surface 142 of the cured sealing layer may be a portion of a final landfill cover, where the final landfill cover may also include a clay liner, a geomembrane, cover soil, and vegetation.

In one or more embodiments, the capping layer 120 may be operable to reduce or prevent landfill gas generated in the waste layer 110 from exiting the landfill 105, for example through the top surface 142, and entering the atmosphere. Furthermore, the capping layer 120 may be operable to prevent waters, including rainwater, from entering the waste layer 110 of the landfill. Without intent to be bound by theory, it is believed that the operability of the capping layer 120 to reduce or prevent landfill gas from escaping the landfill 105 in turn provides a greater ability of the landfill gas recovery system 100 to recover the landfill gas. Furthermore, by decreasing the amount of water that may enter the landfill and percolate through the waste layers 110, the capping layer 120 may reduce the amount of leachates generated by the landfill 105. Furthermore, reducing the amount of leachate generated in the landfill 105 and properly capturing the leachate that is generated within the landfill 105 may prevent formation of leachate pockets within the landfill 105. Leachates are common features of landfills that typically result from waters that are passed out of the landfill and include contaminants such as dissolved organic matter, inorganic compounds, organic compounds, heavy metals, or combinations of these. Leachates are generally considered a hazardous waste and can contribute to groundwater contamination. Therefore, reducing the amount of leachate generated by a landfill 105 and adequately capturing leachate generated by the landfill 105 may reduce the potential for pollution of the environment surrounding the landfill 105.

In one or more embodiments, the loose fill layer 130 may comprise a granular fill material. Examples of suitable granular fill material include, without limitation, sand, soil, crushed stone, crushed rock, crushed brick, crushed concrete, or any other material capable of being bound or sealed by application of a water-soluble polymer, as will be described subsequently in detail. In one or more embodiments, the granular fill material may comprise a granular fill material that is at least 50% by weight sand, based on the total weight of the granular fill material. For example, the granular fill material may comprise a granular fill material that is at least 50% by weight, at least 60% by weight, at least 70% by weight, at least 80% by weight, at least 90% by weight, at least 95% by weight, or even at least 99% by weight sand, based on the total weight of the granular fill material. In one or more embodiments, the granular fill material may consist essentially of sand.

As described herein, "sand" may refer to a mixture of rock and mineral particles. Typical sands have particle sizes from 0.074 millimeters (mm) to 4.75 mm, though it should be recognized that embodiments herein need not be strictly limited to the particular particle sizes. Sand composition may vary widely. Examples of sands include, without limitation silica, quartz, calcite, aragonite, calcium carbonate, gypsum, feldspar, granite, magnetite, chlorite, glauconite, and olivine.

In one or more embodiments, the loose fill layer 130 may have a thickness sufficient to prevent the water soluble polymer used to form the cured sealing layer 140 from contacting the waste layer 110. Accordingly, one of the purposes of the loose fill layer 130 may be to isolate the cured sealing layer 140 from the waste layer 110. In one or more embodiments, the loose fill layer 130 may have a thickness 134 from 20 centimeters (cm) to 40 cm. For example, the loose fill layer 130 may have a thickness 134 from 20 cm to 40 cm, from 25 cm to 40 cm, from 30 cm to 40 cm, from 35 cm to 40 cm, from 20 cm to 35 cm, from 20 cm to 30 cm, from 20 cm to 25 cm, or any combination or subset of these ranges.

In one or more embodiments, the cured sealing layer 140 may comprise a composite of the granular fill material and a cured water soluble polymer. Water soluble polymers include organic materials that dissolve, disperse, or swell in water and that may modify the properties of the resulting aqueous system by gelling, thickening, or emulsifying, for example. In embodiments, the cured water soluble polymer may include products of curing a single water soluble polymer or products of curing a mixture or combination of more than one specific water soluble polymer.

In one or more embodiments, the water soluble polymer may be any water soluble polymer that binds together individual grains or particles of granular materials as previously described upon curing of the water soluble polymer. For example, the water soluble polymer may bind individual sand grains upon curing of the water soluble polymer, so as to produce a solid composite layer of the cured water soluble polymer and the sand. In some embodiments, the water soluble polymers of the cured sealing layer 140 are non-biodegradable non-toxic, or both, and preferably pose low occupational health risks. As one example, the water soluble polymer may include a polyurethane. As a class of materials, polyurethanes generally include polymers produced by reacting an isocyanate having at least two isocyanate groups per molecule with a polyol, typically a polyol having at least two hydroxyl groups per molecule. The properties of the polyurethane may vary depending on the specific isocyanates and polyols reacted to form the polyurethane. In one or more embodiments, the cured polyurethane is a substantially chemically inert product of reacting an isocyanate and a polyol. Examples of isocyanate precursors that form substantially chemically inert polyurethanes include a methylene diphenyl diisocyanates. Without intent to be bound by theory, it is believed that when the composite of the cured sealing layer 140 includes a substantially chemically inert polyurethane, the chemical composition of the cured sealing layer 140 will have minimal environmental impact in landfill applications, such as the systems and methods described herein.

In one or more embodiments, the composite of the granular fill material and the cured water soluble polymer may comprise from 5% to 15% by weight cured water soluble polymer, based on the total weight of the cured sealing layer 140. For example, the composite of the granular fill material and the cured water soluble polymer may comprise from 5% to 15%, from 7% to 15%, from 9% to 15%, from 11% to 15, from 13% to 15%, from 5% to 13%, from 5% to 11%, from 5% to 9%, from 5% to 7%, or any combination or subset of these ranges, by weight cured water soluble polymer, based on the total weight of the cured sealing layer. The composite of the granular fill material may also be operable to withstand seasonal temperature variations in the climate where the landfill is located and, thereby, retain physical integrity and barrier characteristics throughout the course of multiple years.

The cured sealing layer 140 may be substantially impermeable to landfill gases formed within the waste layer 110 of the landfill 105. Generally, "permeability" refers to the ability of a fluid to pass through a material. As described herein, for a material to be "substantially impermeable" to a fluid, the material may have a permeability of less than or equal to 100 millidarcy (md) with respect to that fluid. For example, in one or more embodiments, the permeability of the cured sealing layer 140 to landfill gas may be less than or equal to 100 md, less than or equal to 10 md, less than or equal to 1.0 md, less than or equal to 0.1 md, less than or equal to 0.01 md, or any combination or subset of these ranges. In one or more embodiments, the cured sealing layer 140 may be substantially impermeable to water.

The cured sealing layer may have a thickness 144 sufficient to render the cured sealing layer 140 substantially impermeable to landfill gases and, thereby, capable of preventing substantial escape of landfill gases emanating from the waste layer 110 of the landfill 105. In one or more embodiments, the cured sealing layer may have a thickness 144 from 5 cm to 15 cm. For example, the cured sealing layer may have a thickness 144 from 5 cm to 15 cm, from 7 cm to 15 cm, from 9 cm to 15 cm, from 11 cm to 15 cm, from 13 cm to 15 cm, from 5 cm to 13 cm, from 5 cm to 11 cm, from 5 cm to 9 cm, from 5 cm to 7 cm, or any combination or sub-combination of these ranges.

Optionally in the landfill gas recovery system 100, the capping layer 120 may include a plastic sheet 122 to provide additional barrier characteristics to the capping layer 120. In some embodiments, the plastic sheet 122 may be disposed between the cured sealing layer 140 and the loose fill layer 130. In other embodiments (not depicted), the plastic sheet 122 is disposed between two portions of the loose fill layer 130. The plastic sheet 122 may be operable to add to the ability of the cured sealing layer 140 to prevent the flow of water fully through the loose fill layer 130 and into the waste layer 110. Examples of suitable plastic sheet 122 materials include, without limitation, polyethylenes and poly(vinyl chloride). In one or more embodiments, the plastic sheet 122 may have a thickness from 0.1 mm to 1.0 mm. For example, the plastic sheet 122 may have a thickness from 0.1 mm to 1.0 mm, from 0.1 mm to 0.8 mm, from 0.1 mm to 0.6 mm, from 0.1 mm to 0.4 mm, from 0.1 mm to 0.2 mm, from 0.2 mm to 1.0 mm, from 0.4 mm to 1.0 mm, from 0.6 mm to 1.0 mm, from 0.8 mm to 1.0 mm, or any combination or subset of these ranges.

The landfill gas recovery system 100 may further include a landfill gas collection apparatus 200. The landfill gas collection apparatus 200 may be any apparatus suitable for collecting, recovering, processing, or otherwise further processing landfill gas trapped beneath the cured sealing layer 140 in a manner that prevents escape of the landfill gas into the atmosphere. As in the example embodiment of FIG. 1 shown schematically, the landfill gas collection apparatus 200 may include one or more perforated pipes 210, a manifold 220, and a landfill gas wellhead 230. The one or more perforated pipes 210 may be positioned underneath the cured sealing layer 140. For example, the one or more perforated pipes may be positioned within the loose fill layer 130 as in FIG. 1. Alternatively, the one or more perforated pipes may be positioned within the waste layer 110, or partially within the loose fill layer 130 and partially within the waste layer 110. The perforations in the one or more perforated pipes 210 may be sized to allow entry of landfill gas into the one or more perforated pipes 210 while excluding granular material or solid waste around the one or more perforated pipes 210 from entering into or clogging the perforated pipes 210. In one or more embodiments, a non-woven geotextile fabric may be positioned around at least a portion of a perforated pipe 210. Additionally, a loose fill material, such as gravel, may be positioned between the non-woven geotextile fabric and the perforated pipe. Without intent to be bound by theory, it is believed that positioning a non-woven geotextile fabric and a loose fill material, such as gravel, around a perforated pipe 210 may reduce the likelihood of waste or finer loose fill material, such as sand, clogging the perforations in the perforated pipe.

The one or more perforated pipes 210 may be in fluidic communication with a manifold 220. In one or more embodiments, the one or more perforated pipes 210 may be directly connected to the manifold 220. The manifold 220 may traverse the cured sealing layer 140. The manifold 220 may traverse at least a portion of the loose fill layer 130. In one or more embodiments, the manifold may traverse a portion of the waste layer 110. The manifold may be in fluidic communication with the one or more perforated pipes 210 and the landfill gas wellhead 230. Accordingly, the one or more perforated pipes 210 may be in fluidic communication with the landfill gas wellhead 230.

The landfill gas wellhead 230 may be located outside the landfill 105 and may be any conventional apparatus that facilitates collection or recovery of landfill gas from the landfill 105. In one or more embodiments, the landfill gas collection apparatus 200 may be operable to collect methane from the landfill 105 through the landfill gas wellhead 230.

As described herein, leachate may be generated in the waste layer 110 of the landfill 105. In one or more embodiments, the landfill 105 may comprise a system for capturing leachate. The system for capturing leachate may be any system operable to remove leachate from the landfill and prevent leachate from passing from the landfill into the surrounding environment. The system for capturing leachate may further be operable to pass leachate from the landfill to a means for processing or remediating the leachate.

In further embodiments, the landfill gas recovery system 100 may be implemented in multiple stacked layers, by which a fully operational landfill gas recovery system 100 including a waste layer 110, and a capping layer 120 may be in place underneath additional waste material in the landfill 105. Now referring to FIG. 3, in a stacked landfill gas recovery system 300, the landfill 305 may further comprise a second waste layer 310 overlying the capping layer 120. The second waste layer 310 may be of the same general composition as the waste layer 110 and, thus, may comprise solid municipal waste and optionally may include accumulated daily cover material. In embodiments in which the landfill comprises a second waste layer 310, the capping layer 120 over the waste layer 110 may function further as an intermediate landfill cover. Intermediate landfill cover includes any manner of covering generally established for when the landfill may be inactive for an extended period of time, such as for at least seven days. Intermediate landfill cover may be operable to reduce water infiltration into the landfill and to reduce the amount of landfill gas that escapes from the waste layer 110 already contained in the landfill 105. Additional waste may be disposed in the landfill 305 to form the second waste layer 310 after the installation of the intermediate cover.

In one or more embodiments of the stacked landfill gas recovery system 300, a second loose fill layer 330 may be positioned between the cured sealing layer 140 and the second waste layer 310. The second loose fill layer 330 may be operable to isolate the cured sealing layer 140 from the second waste layer 310. As described previously with relation to the loose fill layer 130, preventing the municipal solid waste disposed in the second waste layer 310 from contacting the cured sealing layer 140 may prevent damage to the cured sealing layer 140 that may reduce the effectiveness of the cured sealing layer 140 for trapping landfill gasses within the landfill 105. Thus, the second loose fill layer 330 has a thickness 334 sufficiently large to prevent damage to the cured sealing layer 140 and thereby maintain the barrier properties of the cured sealing layer 140. In example embodiments, the second loose fill layer 330 may have a thickness 334 from 20 cm to 40 cm. For example, the second loose fill layer 330 may have a thickness 334 from 20 cm to 40 cm, from 25 cm to 40 cm, from 30 cm to 40 cm, from 35 cm to 40 cm, from 20 cm to 35 cm, from 20 cm to 30 cm, from 20 cm to 25 cm, or any combination or subset of these ranges.

Similar to the loose fill layer 130 described previously, the second loose fill layer 330 may comprise a granular fill material. In one or more embodiments, the second loose fill layer 330 may comprise a granular fill material that is at least 50% by weight of sand, based on the total weight of the granular fill material. For example, the second loose fill layer 330 may comprise a granular fill material that is at least 50% by weight, at least 60% by weight, at least 70% by weight, at least 80% by weight, at least 90% by weight, at least 95% by weight, or even at least 99% by weight sand, based on the total weight of the granular fill material. In one or more embodiments, the granular fill material may consist essentially of sand.

In one or more embodiments, the second loose fill layer 330 may be in direct contact with the cured sealing layer 140. The direct contact between the second loose fill layer 330 and the cured sealing layer may be located along a top surface 142 of the cured sealing layer 140. In embodiments, the second waste layer may be in direct contact with the second loose fill layer 330. The direct contact between the second loose fill layer 330 and the second waste layer 310 may be located along a bottom surface 332 of the second loose fill layer 330.

Figure 3:
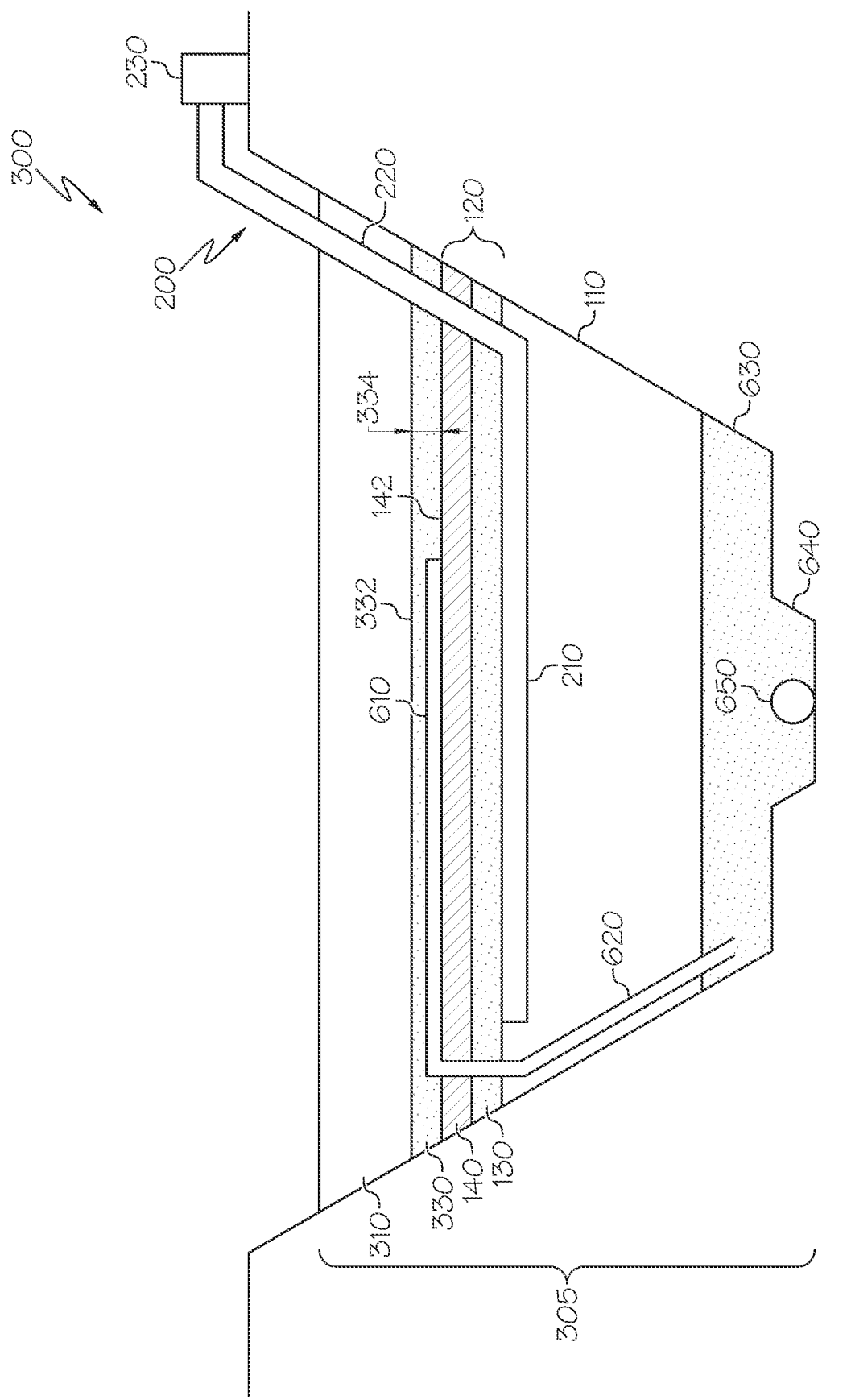
FIG. 3 is a cross-sectional view of a landfill gas recovery system, according to one or more embodiments described in this disclosure.

Still referring to FIG. 3, when the landfill 305 further comprises a second waste layer 310 and a second loose fill layer 330, the manifold 220 may traverse the cured sealing layer 140, the second loose fill layer 330, and the second waste layer 310 as it passes from the one or more perforated pipes 210 to the landfill gas wellhead 230.

In the embodiment depicted in FIG. 3, leachate may be formed in the second waste layer 310 above the cured sealing layer 140. Since the cured sealing layer 140 may be substantially impermeable to the leachate, the landfill 305 may comprise a means for passing leachate through the cured sealing layer 140 without negatively impacting the ability of the cured sealing layer 140 to trap landfill gas. In one or more embodiments, one or more leachate collection pipes 610 may be positioned in the second loose fill layer 330. The one or more leachate collection pipes 610 may be perforated pipes where the perforations are sized to accommodate the passage of leachate into the one or more leachate collection pipes 610. The one or more leachate collection pipes 610 may be in fluidic communication with a drainage pipe 620. In embodiments, the one or more leachate collection pipes 610 may be directly connected to the drainage pipe 620. The drainage pipe 620 may traverse the cured sealing layer 140, allowing leachate to pass from the second waste layer 310 to a base layer 630. In embodiments, the drainage pipe 620 may traverse the second loose fill layer 330 and the second waste layer 310 such that additional leachate collection pipes positioned above the second waste layer 310 may be connected to the drainage pipe 620. The base layer 630 may comprise a granular material and may be positioned below the waste layer 110. The leachate may pass through the base layer 630 to a sump 640 where a system for capturing leachate 650 may remove the leachate from the landfill 305. The system for capturing leachate 650 may be any system operable to remove leachate from the landfill 305 and prevent leachate from passing from the landfill 305 into the surrounding environment. The system for capturing leachate 650 may further be operable to pass leachate from the landfill 305 to a means for processing or remediating the leachate.

Figure 4:
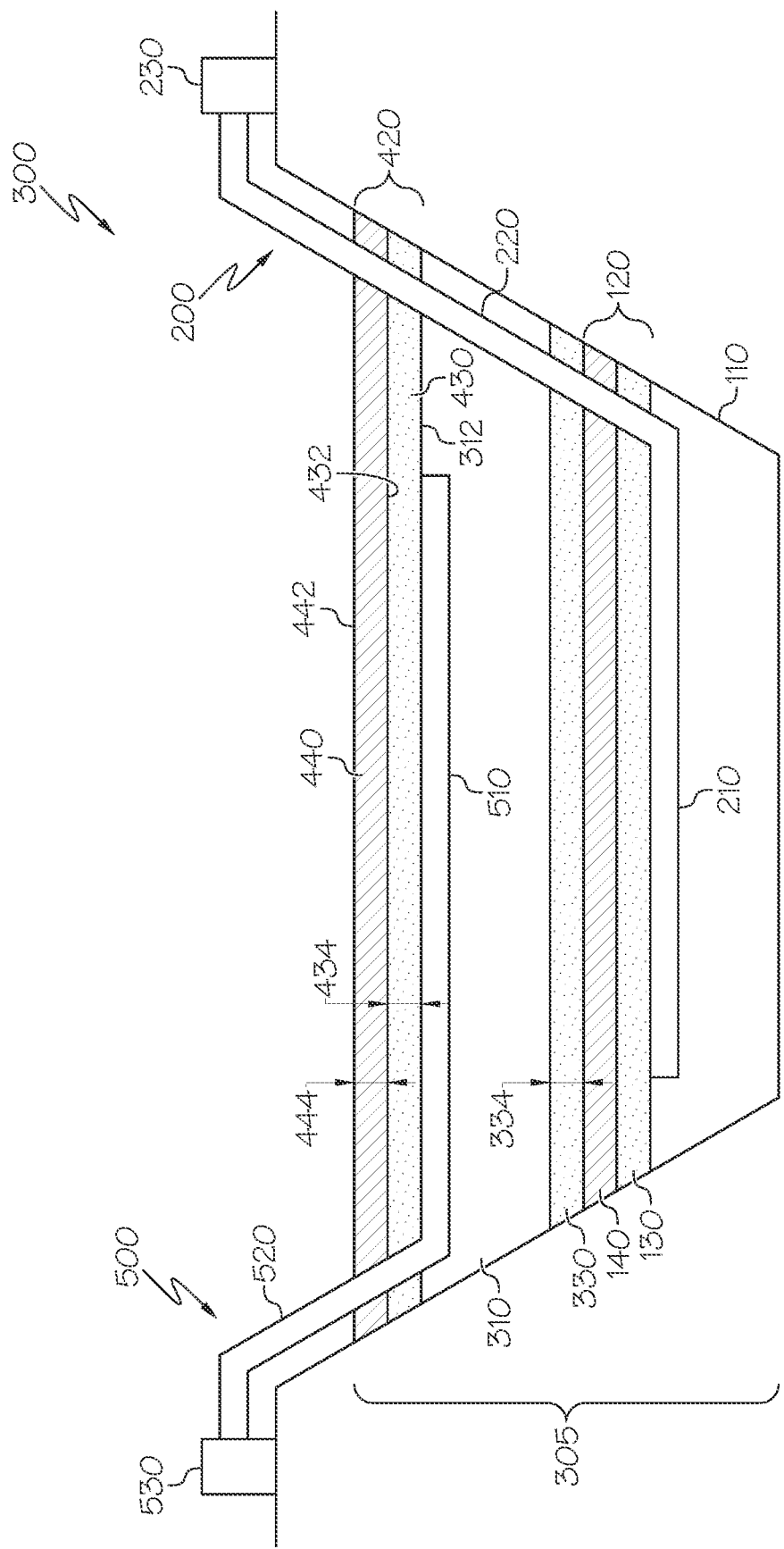
FIG. 4 is a cross sectional view of a landfill gas recovery system, according to one or more embodiments described in this disclosure.

In further embodiments, the stacked landfill gas recovery system 300 may include two discrete zones of waste material, from either or both of which zones the landfill gas may be recovered. Referring now to FIG. 4, the landfill 305 having the waste layer 110 and the second waste layer 310 may further include a second capping layer 420 overlying the second waste layer 310. The second capping layer 420 may comprise a third loose fill layer 430 and a second cured sealing layer 440. The third loose fill layer 430 may be positioned between the second cured sealing layer 440 and the second waste layer 310. In one or more embodiments, the third loose fill layer 430 may be in direct contact with the second waste layer 310. The direct contact between the second waste layer 310 and the third loose fill layer 430 may be located along at a top surface 312 of the second waste layer. The third loose fill layer 430 may be in direct contact with the second cured sealing layer 440. The direct contact between the third loose fill layer 430 and the second cured sealing layer 440 may be located along a bottom surface 432 of the third loose fill layer 430.

In one or more embodiments, the top surface 442 of the second cured sealing layer 440 may be an air-side surface. When the top surface 442 of the second cured sealing layer 440 is an air-side surface, the second capping layer 420 may function as a final cover for the landfill 305. In one or more embodiments, the top surface 422 of the second cured sealing layer 440 may be a portion of a final landfill cover, where the final landfill cover may also include a clay liner, a geomembrane, a layer of cover soil, and vegetation.

In like manner to the capping layer 120, in one or more embodiments, the second capping layer 420 of the stacked landfill gas recovery system 300 may be operable to reduce or prevent landfill gas generated in the second waste layer 310 from exiting the landfill 105 and entering the atmosphere. Furthermore, the second capping layer 420 may prevent waters, including rainwater, from entering the waste layer 110 of the landfill 305 underneath the second waste layer 310.

In like manner to the cured sealing layer 140, the second cured sealing layer 440 of the stacked landfill gas recovery system 300 may comprise a composite of the granular fill material and a cured water soluble polymer. The composite of the granular fill material and the cured water soluble polymer may comprise from 5% to 15% by weight cured water soluble polymer, based on the total weight of the cured sealing layer 140. For example, the composite of the granular fill material and the cured water soluble polymer may comprise from 5% to 15%, from 7% to 15%, from 9% to 15%, from 11% to 15%, from 13% to 15%, from 5% to 13%, from 5% to 11%, from 5% to 9%, from 5% to 7%, or any combination or subset of these ranges, by weight cured water soluble polymer, based on the total weight of the cured sealing layer.

The second cured sealing layer 440 may be substantially impermeable to landfill gases formed within or rising upwardly from the waste layer 110 of the landfill 305, the second waste layer 310, or both. Furthermore, the second cured sealing layer 440 may be substantially impermeable to water. In one or more embodiments, the second cured sealing layer 440 may have a thickness 444 from 5 cm to 15 cm. For example, the second cured sealing layer 440 may have a thickness 444 from 5 cm to 15 cm, from 7 cm to 15 cm, from 9 cm to 15 cm, from 11 cm to 15 cm, from 13 cm to 15 cm, from 5 cm to 13 cm, from 5 cm to 11 cm, from 5 cm to 9 cm, from 5 cm to 7 cm, or any combination or subset of these ranges.

As discussed previously with respect to the loose fill layer 130, preventing the municipal solid waste disposed in the second waste layer 310 from contacting the second cured sealing layer 440 may prevent damage to the second cured sealing layer 440 that may reduce the effectiveness of the cured sealing layer for trapping landfill gasses within the landfill 305. As such, the third loose fill layer 430 may have a thickness 434 from 20 cm to 40 cm. For example, the third loose fill layer 430 may have a thickness 434 from 20 cm to 40 cm, from 25 cm to 40 cm, from 30 cm to 40 cm, from 35 cm to 40 cm, from 20 cm to 35 cm, from 20 cm to 30 cm, from 20 cm to 25 cm, or any combination or subset of these ranges.

The third loose fill layer 430 may comprise a granular fill material, such as any of the granular fill materials described with respect to the loose fill layer 130. In one or more embodiments, the third loose fill layer 430 may comprise a granular fill material that is at least 50% by weight sand, based on the total weight of the granular fill material. For example, the third loose fill layer 430 may comprise a granular fill material that is at least 50% by weight, at least 60% by weight, at least 70% by weight, at least 80% by weight, at least 90% by weight, at least 95% by weight, or even at least 99% by weight sand, based on the total weight of the granular fill material. In one or more embodiments, the granular fill material may consist essentially of sand.

In embodiments in which the landfill 105 comprises a second capping layer 420, the stacked landfill gas recovery system 300 may comprise a second landfill gas collection apparatus 500. The second landfill gas collection apparatus 500 may be any apparatus suitable for collecting, recovering, processing, or otherwise further processing landfill gas trapped beneath the second cured sealing layer 440. In one or more embodiments, the second landfill gas collection apparatus 500 may include one or more perforated pipes 510, a second manifold 520, and a second landfill gas wellhead 530. The one or more perforated pipes 510 may be positioned underneath the second cured sealing layer 440 and above the cured sealing layer 140. For example, the one or more perforated pipes 510 may be positioned within the third loose fill layer 430, within the second waste layer 310, or partially within the third loose fill layer 430 and partially within the second waste layer 310.

The one or more perforated pipes 510 may be in fluidic communication with the second manifold 520. In one or more embodiments, the one or more perforated pipes 510 may be directly connected to the second manifold 520. The second manifold 520 may traverse the second cured sealing layer 440. The second manifold 520 may traverse at least a portion of the third loose fill layer 430, and in one or more embodiments, the second manifold 520 may traverse at least a portion of the second waste layer 310. The second manifold 520 may be in fluidic communication with the one or more perforated pipes 510 and the second landfill gas wellhead 530. Accordingly, the one or more perforated pipes 510 may be in fluidic communication with the second landfill gas wellhead 530.

In one or more alternative embodiments, the one or more perforated pipes may be in fluidic communication with manifold 220 allowing the second landfill gas collection apparatus 500 to operate without a second manifold 520 and a second landfill gas wellhead 530. In one or more embodiments, the manifold 220 may traverse the second cured sealing layer 440, the third loose fill layer 430, and the second waste layer 310 to connect the one or more perforated pipes 210 to the landfill gas wellhead 230.

Having described various embodiments of landfill gas recovery systems, methods for sealing a landfill for the recovery of a landfill gas will now be described. The methods for sealing a landfill may result in a landfill comprising at least one capping layer 120 as previously described with respect to the landfill gas recovery systems. Referring to FIG. 1, in one or more embodiments, methods for sealing a landfill 105 may comprise applying an aqueous solution comprising a water soluble polymer onto a landfill cover overlying a waste layer 110 of a landfill 105. In embodiments, the landfill cover may comprise a loose fill layer 130 comprising a granular fill material. In one or more embodiments, the granular fill material may comprise a granular fill material that is at least 50% by weight sand, based on the total weight of the granular material. For example, the granular fill material may comprise a granular fill material that is at least 50% by weight, at least 60% by weight, at least 70% by weight, at least 80% by weight, at least 90% by weight, at least 95% by weight, or even at least 99% by weight sand, based on the total weight of the granular fill material.

In one or more embodiments, the aqueous solution may comprise the water soluble polymer and water and the concentration of water soluble polymer in the aqueous solution may be from 3% by weight to 9% by weight based on the weight of the aqueous solution. For example, the concentration of the water soluble polymer may be from 3% by weight to 9% by weight, from 5% by weight to 9% by weight, from 7% by weight to 9% by weight, from 3% by weight to 7% by weight, from 3% by weight to 5% by weight, or any combination or sub-combination of these ranges. In one or more embodiments, the aqueous solution may consist essentially of water soluble polymer and water. The water soluble polymer may be any uncured water soluble polymer as previously described with respect to the landfill gas recovery systems, including without limitation a polyurethane. The water may comprise any type of water capable of solvating or at least partially dissolving the water soluble polymer, including but not limited to freshwater, distilled water, saltwater, seawater, brine, brackish water, potable water, non-potable water, processed wastewater, or water from any other suitable source.

In one or more embodiments, applying the aqueous solution may include any technique or combination of techniques capable of distributing the aqueous solution over the exposed surface area of the loose fill layer 130. In embodiments, applying the aqueous solution may include spraying, pouring, spattering, showering, or combinations of these. In some embodiments, applying the aqueous solution may include spraying the aqueous solution onto the loose fill layer of the landfill cover. The aqueous solution may be sprayed through any suitable apparatus comprising one or more nozzles that are operable to spray the aqueous solution over the loose fill material. The aqueous solution may be sprayed onto the loose fill layer at a rate sufficient to saturate the loose fill layer to a desired depth. In one or more embodiments, the aqueous solution may be sprayed onto the loose fill layer at a rate from 5 liters per square meter ($L/m^2$) to 15 $L/m^2$. For example, the aqueous solution may be sprayed onto the loose fill layer at a rate from 5 $L/m^2$ to 15 $L/m^2$, from 7 $L/m^2$ to 15 $L/m^2$, from 9 $L/m^2$ to 15 $L/m^2$, from 11 $L/m^2$ to 15 $L/m^2$, from 13 $L/m^2$ to 15 $L/m^2$, from 5 $L/m^2$ to 13 $L/m^2$, from 5 $L/m^2$ to 11 $L/m^2$, from 5 $L/m^2$ to 9 $L/m^2$, from 5 $L/m^2$ to 7 $L/m^2$, or any combination or sub-combination of these ranges. In one or more embodiments, the aqueous solution may be applied to the loose fill layer until the loose fill layer is saturated to a depth from 5 cm to 15 cm. For example, the aqueous solution may be applied to the loose fill layer until the loose fill layer is saturated to a depth from 5 cm to 15 cm, from 7 cm to 15 cm, from 9 cm to 15 cm, from 11 cm to 15 cm, from 13 cm to 15 cm, from 5 cm to 13 cm, from 5 cm to 11 cm, from 5 cm to 9 cm, from 5 cm to 7 cm, or any combination or subset of these ranges.

In one or more embodiments, the loose fill layer may further comprise a plastic sheet between a first portion of the loose fill layer 130 and a second portion of the loose fill layer 130, whereby a position of the plastic sheet determines a depth of the loose fill layer 130 to which the aqueous solution saturates the granular fill material. The plastic sheet may be operable to add to the ability of the cured sealing layer 140 to prevent the flow of water fully through the loose fill layer 130 and into the waste layer 110. Examples of suitable plastic sheet materials include, without limitation, polyethylenes and poly(vinyl chloride). In one or more embodiments, the plastic sheet may have a thickness from 0.1 mm to 1.0 mm. Without intent to be bound by theory, it is believed that the plastic sheet may be substantially impermeable to the aqueous solution. As such, the presence of the plastic sheet in the loose fill layer 130 may ensure that only the portion of the loose fill layer 130 is saturated with the aqueous solution. This may allow for a layer of granular material to be present between the waste layer 110 and the cured sealing layer 140. Furthermore, positioning the plastic sheet within the loose fill layer 130 may allow for greater control over the thickness of the loose fill layer 130 that may be saturated by the aqueous solution.

The method for sealing a landfill for the recovery of a landfill gas may further comprise allowing the aqueous solution to cure to form a capping layer 120 over the landfill 105. As previously described, the capping layer 120 may comprise a cured sealing layer 140 and a loose fill layer 130 positioned between the waste layer 110 and the cured sealing layer 140. In one or more embodiments, the aqueous solution may be allowed to cure over a curing period from 3 hours to 144 hours. For example, the curing period may be from 3 hours to 144 hours, from 12 hours to 144 hours, from 24 hours to 144 hours, from 36 hours to 144 hours, from 48 hours to 144 hours, from 60 hours to 144 hours, from 72 hours to 144 hours from 84 hours to 144 hours, from 96 hours to 144 hours, from 108 hours to 144 hours, from 120 hours to 144 hours, from 136 hours to 144 hours, or any combination or subset of these ranges. In embodiments in which the capping layer 120 is an intermediate cover, a second loose fill layer 330 may be deposited over the capping layer 120 after the curing period has fully elapsed. Without intent to be bound by theory, it is believed that allowing the aqueous solution to fully cure before covering the capping layer 120 with additional granular material or waste may reduce the likelihood of damage occurring to the capping layer 120, which could reduce the effectiveness of the capping layer for trapping landfill gasses within the landfill 105.

In one or more embodiments, the methods for sealing a landfill for the recovery of a landfill gas may further comprise installing a landfill gas collection apparatus 200 in the landfill 105. Specifically, the method may include installing one or more perforated pipes 210 in the landfill 105. The one or more perforated pipes 210 may be installed in the waste layer 110 before a loose fill layer 130 is deposited over the waste layer 110. Alternatively, the one or more perforated pipes may be installed in the loose fill layer 130 as the loose fill layer is being deposited over the waste layer 110. The one or more perforated pipes 210 may be attached to the manifold 220 before the one or more perforated pipes 210 are covered by the waste layer 110, the loose fill layer 130, or both. The manifold 220 may extend through the loose fill layer 130 before the aqueous solution is applied to the loose fill layer to form the cured sealing layer 140. Without intent to be bound by theory, it is believed that the manifold 220 should be installed before the application of the aqueous solution to the loose fill layer, so that the granular material may be cured to the manifold, creating a seal to prevent landfill gasses from escaping between the manifold and the cured sealing layer. If the manifold 220 is installed after the aqueous solution comprising the water soluble polymers has cured, then the installation of the manifold 220 may damage the cured sealing layer 140 and allow landfill gasses to escape from the landfill.

In one or more embodiments, the capping layer 120 may be installed shortly before the waste disposed in the landfill begins producing methane. Without intent to be bound by theory, it is believed that municipal solid waste disposed in a landfill produces a negligible amount of methane when initially deposited within the landfill, especially during aerobic decomposition of the waste. Once anaerobic decomposition begins, the amount of methane generated from decomposition of the waste may increase. In some cases, the methane generation may begin increasing after the waste has been in the landfill for about one year. Thus, the capping layer may be installed by methods described herein just before the decomposition of waste begins producing methane.

In one or more embodiments, the methods for sealing a landfill for the recovery of a landfill gas may further comprise depositing a second loose fill layer 330 over the capping layer 120. The method may further comprise depositing a second waste layer 310 over the second loose fill layer 330. Furthermore the methods for sealing a landfill may include installing a second capping layer 420 over the second waste layer 310. Optionally, additional waste layers and capping layers may be installed until the physical constraints of the landfill provide no additional room for the deposition of additional municipal solid waste and landfill cover.

In a first aspect of the present disclosure, a landfill gas recovery system may comprise a waste layer disposed in a landfill and a capping layer overlying the waste layer. The capping layer may comprise a cured sealing layer and a loose fill layer between the waste layer and the cured sealing layer. The loose fill layer may comprise a granular fill material. The cured sealing layer may comprise a composite of the granular fill material and a cured water soluble polymer. The cured sealing layer is substantially impermeable to landfill gases formed within the waste layer.

A second aspect of the present disclosure may include the first aspect where the composite may comprise from 5% to 15% by weight cured water soluble polymer, based on the total weight of the cured sealing layer.

A third aspect of the present disclosure may include either of the first or second aspects where the landfill gas recovery system further comprises landfill gas collection apparatus positioned at least partially under the cured sealing layer and in fluidic communication with landfill gas wellhead outside the landfill.

A fourth aspect of the present disclosure may include the third aspect where the landfill gas collection apparatus comprises a manifold that passes through at least the cured sealing layer and connects perforated recovery pipes under the cured sealing layer to the landfill gas wellhead.

A fifth aspect of the present disclosure may include any of the first through fourth aspects where the granular fill material comprises at least 50% by weight sand, based on the total weight of the granular fill material.

A sixth aspect of the present disclosure may include any of the first through fifth aspects where the cured water soluble polymer comprises a polyurethane.

A seventh aspect of the present disclosure may include any of the first through sixth aspects where the granular fill material comprises at least 50% by weight sand, based on the total weight of the granular fill material; the cured sealing layer comprises from 5% to 15% by weight cured water soluble polymer, based on the total weight of the cured sealing layer; and the cured water soluble polymer comprises a polyurethane.

An eighth aspect of the present disclosure includes any of the first through sixth aspects where the landfill gas recovery system further comprises a plastic sheet between the cured sealing layer and the loose fill layer.

A ninth aspect of the present disclosure may include the eighth aspect where the plastic sheet comprises polyethylene or polyvinylchloride.

A tenth aspect of the present disclosure may include any of the first through ninth aspects where the landfill further comprises a second waste layer overlying the capping layer.

An eleventh aspect of the present disclosure may include the tenth aspect where the landfill further comprises a second granular layer between the second waste layer and the capping layer.

In a twelfth aspect of the present disclosure, a method for sealing a landfill for recovery of landfill gas from the landfill may comprise applying an aqueous solution comprising a water soluble polymer onto a landfill cover overlying a waste layer of a landfill. The landfill cover may comprise a loose fill layer comprising a granular fill material. The method may comprise continuing to apply the aqueous solution until at least a portion of the granular fill material is saturated with the aqueous solution to a predetermined depth of the granular fill material and allowing the aqueous solution to cure to form a capping layer over the landfill. The capping layer may comprise a cured sealing layer and an uncured portion of the loose fill layer between the waste layer and the cured sealing layer. The cured sealing layer may comprise a composite of the granular fill material and a cured product of the water soluble polymer. The cured sealing layer may be substantially impermeable to landfill gases formed within the waste layer.

A thirteenth aspect of the present disclosure may include the twelfth aspect where the aqueous solution comprises the water soluble polymer and water and the concentration of the water soluble polymer in the aqueous solution is from 3% to 9% by weight based on the weight of the aqueous solution.

A fourteenth aspect of the present disclosure may include either the twelfth or thirteenth aspects where the composite comprises from 5% to 15% by weight cured water soluble polymer, based on the total weight of the cured sealing layer.

A fifteenth aspect of the present disclosure may include any of the twelfth through fourteenth aspects where the water soluble polymer comprises a polyurethane.

A sixteenth aspect of the present disclosure may include any of the twelfth through fifteenth aspects where the granular material comprises at least 50% by weight sand, based on the total weight of the granular material.

A seventeenth aspect of the present disclosure may include any of the twelfth through sixteenth aspects where the landfill cover further comprises a plastic sheet between a first portion of the loose fill layer and a second portion of the loose fill layer, whereby a position of the plastic sheet determines a depth of the loose fill layer to which the aqueous solution saturates the granular fill material.

An eighteenth aspect of the present disclosure may include the seventeenth aspect where the plastic sheet comprises polyethylene or polyvinylchloride.

A nineteenth aspect of the present disclosure may include any of the twelfth through eighteenth aspects where applying the aqueous solution comprising the water soluble polymer onto the landfill cover overlying the waste layer of the landfill comprises spraying the aqueous solution onto the landfill cover.

A twentieth aspect of the present disclosure may include the nineteenth aspect where the aqueous solution is sprayed onto the landfill cover at a rate from 5 L/m$^2$ to 15 L/m$^2$.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% of that second component (where % can be weight % or molar %).

Additionally, the term "consisting essentially of" is used in this disclosure to refer to quantitative values that do not materially affect the basic and novel characteristic(s) of the disclosure.

It should be understood that any two quantitative values assigned to a property or measurement may constitute a range of that property or measurement, and all combinations of ranges formed from all stated quantitative values of a given property or measurement are contemplated in this disclosure.

The invention claimed is:

1. A landfill gas recovery system comprising:
  a waste layer disposed in a landfill;
  a capping layer overlying the waste layer, the capping layer comprising a cured sealing layer and a loose fill layer between the waste layer and the cured sealing layer; and
  a landfill gas collection apparatus positioned at least partially under the cured sealing layer and in fluidic communication with a landfill gas wellhead outside the landfill,
  wherein:
  the loose fill layer comprises a granular fill material;
  the cured sealing layer comprises a composite of the granular fill material and a cured water soluble polymer;
  the cured sealing layer is substantially impermeable to landfill gases formed within the waste layer; and
  the cured sealing layer has a thickness from 5 cm to 15 cm.

2. The landfill gas recovery system of claim 1, wherein the composite comprises from 5% to 15% by weight cured water soluble polymer, based on the total weight of the cured sealing layer.

3. The landfill gas recovery system of claim 1, wherein the landfill gas collection apparatus comprises a manifold that passes through at least the cured sealing layer and connects perforated recovery pipes under the cured sealing layer to the landfill gas wellhead.

4. The landfill gas recovery system of claim 1, wherein the granular fill material comprises at least 50% by weight sand, based on the total weight of the granular fill material.

5. The landfill gas recovery system of claim 1, wherein the cured water soluble polymer comprises a polyurethane.

6. The landfill gas recovery system of claim 1, wherein:
  the granular fill material comprises at least 50% by weight sand, based on the total weight of the granular fill material;
  the cured sealing layer comprises from 5% to 15% by weight cured water soluble polymer, based on the total weight of the cured sealing layer; and
  the cured water soluble polymer comprises a polyurethane.

7. The landfill gas recovery system of claim 1, further comprising a plastic sheet between the cured sealing layer and the loose fill layer.

8. The landfill gas recovery system of claim 7, wherein the plastic sheet comprises polyethylene or polyvinylchloride.

9. The landfill gas recovery system of claim 1, wherein the landfill further comprises a second waste layer overlying the capping layer.

10. The landfill gas recovery system of claim 9, wherein the landfill further comprises a second granular layer between the second waste layer and the capping layer.

11. The landfill gas recovery system of claim 1, wherein the loose fill layer has a thickness from 20 cm to 40 cm.

12. A method for sealing a landfill for recovery of a landfill gas from the landfill, the method comprising:
  applying an aqueous solution comprising a water soluble polymer onto a landfill cover overlying a waste layer of a landfill, the landfill cover comprising a loose fill layer comprising a granular fill material;
  continuing to apply the aqueous solution until at least a portion of the granular fill material is saturated with the aqueous solution to a predetermined depth of the granular fill material; and
  allowing the aqueous solution to cure to form a capping layer over the landfill, the capping layer comprising a cured sealing layer and an uncured portion of the loose fill layer between the waste layer and the cured sealing layer,
  wherein:
  the cured sealing layer comprises a composite of the granular fill material and a cured product of the water soluble polymer;
  the cured sealing layer is substantially impermeable to landfill gases formed within the waste layer; and
  the predetermined depth of the granular fill material is from 5 cm to 15 cm.

13. The method of claim 12, wherein the aqueous solution comprises the water soluble polymer and water and the concentration of the water soluble polymer in the aqueous solution is from 3% to 9% by weight based on the weight of the aqueous solution.

14. The method of claim 12, wherein the composite comprises from 5% to 15% by weight cured water soluble polymer, based on the total weight of the cured sealing layer.

15. The method of claim 12, wherein the water soluble polymer comprises a polyurethane.

16. The method of claim 12, wherein the granular material comprises at least 50% by weight sand, based on the total weight of the granular material.

17. The method of claim 12, wherein the landfill cover further comprises a plastic sheet between a first portion of the loose fill layer and a second portion of the loose fill layer, whereby a position of the plastic sheet determines a depth of the loose fill layer to which the aqueous solution saturates the granular fill material.

18. The method of claim 17, wherein the plastic sheet comprises polyethylene or polyvinylchloride.

19. The method of claim 12, wherein applying the aqueous solution comprising the water soluble polymer onto the landfill cover overlying the waste layer of the landfill comprises spraying the aqueous solution onto the landfill cover.

20. The method of claim 19, wherein the aqueous solution is sprayed onto the landfill cover at a rate from 5 $L/m^2$ to 15 $L/m^2$.

* * * * *